(12) United States Patent
Rossteuscher et al.

(10) Patent No.: US 6,948,851 B2
(45) Date of Patent: Sep. 27, 2005

(54) LINEAR GUIDE DEVICE

(75) Inventors: Heinz Rossteuscher, Schwebheim (DE); Rudolf Schlereth, Frauenroth (DE)

(73) Assignee: Rexroth Star GmbH, Schweinfurt (DE)

( * ) Notice: Subject to any disclaimer, the term of this patent is extended or adjusted under 35 U.S.C. 154(b) by 0 days.

(21) Appl. No.: 10/768,892

(22) Filed: Jan. 30, 2004

(65) Prior Publication Data

US 2004/0218840 A1 Nov. 4, 2004

(30) Foreign Application Priority Data

Jan. 31, 2003 (DE) .......................................... 103 03 948

(51) Int. Cl.⁷ .............................................. F16L 29/06
(52) U.S. Cl. ...................................................... 384/45
(58) Field of Search ............................. 384/45, 44, 43; 464/168

(56) References Cited

U.S. PATENT DOCUMENTS

| 3,797,897 A | 3/1974 | Schaeffler |
| 3,802,752 A | 4/1974 | Koschmieder et al. |
| 4,372,623 A | 2/1983 | Koschmieder |
| 4,634,295 A | 1/1987 | Agari |
| 6,168,313 B1 | 1/2001 | Edelmann et al. |

FOREIGN PATENT DOCUMENTS

| DE | 2 202 085 | 8/1973 |
| DE | 76 15 699 | 9/1976 |
| DE | 21 21 847 | 3/1979 |
| DE | 28 14 371 | 10/1979 |
| DE | 28 37 740 C3 | 12/1986 |
| DE | 295 09 952 U1 | 9/1995 |
| DE | 198 06 139 A1 | 8/1999 |
| EP | 1 164 358 A1 | 12/2001 |

Primary Examiner—Lenard A. Footland
(74) Attorney, Agent, or Firm—Michael J. Striker

(57) ABSTRACT

A linear guide device has a guide rail, a guide car reciprocatingly movable on the guide rail in a longitudinal direction, a roll body revolving unit in which an endless row of roll bodies revolve, the roll body revolving unit having a load supporting portion which the roll bodies come in the load supporting engagement with a guide path of the guide rail and also with a running path of the guide car, the running path of the guide car being formed on a running path element which is connected with the guide car and which at least on a roll body entry-side end has a free supporting portion which is not supported on the guide car, the free supporting portion having a length which is at least equal to a diameter of the roll bodies.

10 Claims, 1 Drawing Sheet

LINEAR GUIDE DEVICE

BACKGROUND OF THE INVENTION

The present invention relates generally to linear guide devices.

More particularly it relates to a linear guide device which has a guide rail, a guide car which is reciprocatingly movable in a longitudinal direction on the guide rail, and a roll body revolving unit in which an endless row of roll bodies revolve, wherein the roll body revolving unit has a load-supporting portion in which the roll bodies are in load-supporting engagement on the one hand a guide path of the guide rail and on the other hand with a running path of the guide car, and wherein the running path of the guide car is formed on a running path element which is connected with the guide car and which at least on its roll body inlet-side end has a free supporting portion which is not supported on the guide car.

German patent document DE 198 06 139 A1 discloses a linear guide which in the region of the axial ends of the running path element is provided with recesses for permitting a deviation of the associated ends of the running part element. Thereby a uniform entry of the roll bodies into the load-supporting portion of the roll body revolving unit is guaranteed both during a momentary loading and shaft bending as well as in case of shape errors in the guiding system, or in other words in extraordinary loading conditions of the linear guide device. The length of the free supporting portion of the running path element has a magnitude which is significantly smaller than the diameter of the roll bodies.

SUMMARY OF THE INVENTION

The merits of the present invention resides not only in dealing with the question whether with such a free supporting portion of the running path element the running properties of the linear guide device also in completely normal situations, for example the unloaded running, can be improved.

Moreover, the inventor was not deferred by negative search obtained with a pure transfer of the features known from the German document DE 198 06 139 A1, in particular the use of this document short free supporting portion, but instead conducted further research works and research series.

He found that also in normal operation of the corresponding linear guide devices, the running properties in particular the friction properties and course accuracy can be reduced when the free supporting portion has a length at least equal to the diameter of the roll bodies.

This is especially true for linear guide devices, in which the running path element is composed of steel and the thickness of the free supporting portion of the running path element amounts to between substantially 1 mm and substantially 30 mm, and also in which the roll bodies are composed of steel or ceramics and have a diameter between substantially 1 mm and substantially 20 mm. The total deformation of the roll bodies when the roll bodies enter the load-supporting portion of the roll body revolving unit on the one hand and the running paths in the guide rail and the guide car or the running path element on the other hand have a magnitude of at most substantially 100 $\mu$m. The accurate value of the total deformation can be calculated with the Herz formula. From the experience the contributions of the roll body and the running path however are on the same order of magnitude.

With consideration of the inventive dimension rule, significantly better running properties and lower friction forces, in particular lower friction force fluctuations can be obtained than in conventional linear guide devices, in particular than in the linear guide device disclosed in the German patent document DE 198 06 139 A1. The reason is that with the inventive dimensional rule it is guaranteed that the roll bodies enter the region of the load supporting portion of the supporting portion of the roll body revolving unit in a load free manner, so that they take over the load not in a jerky way, but instead continually.

With the simultaneous limiting of the length of the free-supporting portion to at most 3.5 times the diameter of the roll bodies it is guaranteed that the inlet region is dimensioned as short as possible so that the linear guide device has still a sufficient supporting property and rigidity. With a predetermined running car length the supporting property of the running car reduces with reducing length of the inlet region.

Very good results are obtained for example when the free supporting portion of the running path element has a length which equal at least to 1.2 times the diameter of the roll bodies, for example substantially 1.6–1.9 times the diameter of the roll bodies.

The researches performed by the applicant further show that it is advisable to provide the free supporting portion of the running path element substantially composed of two underportions, namely a first underportion in which the free supporting portion is elastically deformed by the entry of the roll bodies and a second underportion which in the course of the elastic deformation of the first underportion serves as an entry incline for the roll bodies.

In a further embodiment of the invention it is proposed to select the length of the elastically deformable first underportion of the free supporting portion of the running path element at most to be 1.5 times the diameter of the roll bodies. The length of the second underportion which serves as a precision incline due to the elastic deformation of the first underportion can be dimensioned so that the roll bodies in the region of the free end of the running path element can enter the region of the free supporting portion of the running path element actually load free.

When the running path elements are very rigid, for example the running elements are composed of steel with the free-supporting portion having a thickness of more than 15 mm, it can happen that the free supporting portion is elastically deformed not only by a single roll body. Also, in this case the main deformation of the free-supporting portion is caused by such a roll body which is arranged the closest to the load supporting portion of the roll body revolving unit. In this case the expression "length of the elastically deformed, first underportion" identifies the distance which the roll body responsible for the main deformation has from the load supporting portion of the roll body revolving unit when the associated roll body is directly transferred to the load supporting portion of the roll body revolving unit.

For limiting the length of the second underportion to a lowest possible magnitude, at least a part of the free supporting portion of the running path element can be formed as an entry incline. In other words, the load free entry of the roll bodies is in this case possible not only by the elastic deformation of the first underportion, but also by a corresponding deformation of the second underportion and when desired also the first underportion.

As not known from the German patent document DE 198 06 139 A1, the free supporting portion of the running path element can be provided by a recess formed on the guiding car. In addition or alternatively the free supporting portion of the running path is provided by a recess which is formed on the running path element itself.

With linear guide devices usually measuring devices are also used for detecting the position. Known measuring devices use different measuring principles. Some of these measuring principles, for example the inductive measuring principle known from EP 1 164 358 A1, respond sensitively to changes in the distances between the guide car on which the sensor is located and the guide rail on which the measuring scale comprising a graduation is located. With usual linear guide devices, however, there are tumbling movements of the guide car relative to the guide rail due to the comparable excursive taking up of loads when the roll bodies enter the load supporting section of the roll body revolving unit. The influences on the position detection signal caused by this tumbling movement must be removed from it by means of a relatively complex compensation process. By using a free supporting section on a running path element connected with the guide car the tumbling movement of the guide car relative to the guide rail and with it also its influence on the position detection signal can be decreased, in particular when this free supporting section has the dimensions according to the invention.

The novel features which are considered as characteristic for the present invention are set forth in particular in the appended claims. the invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
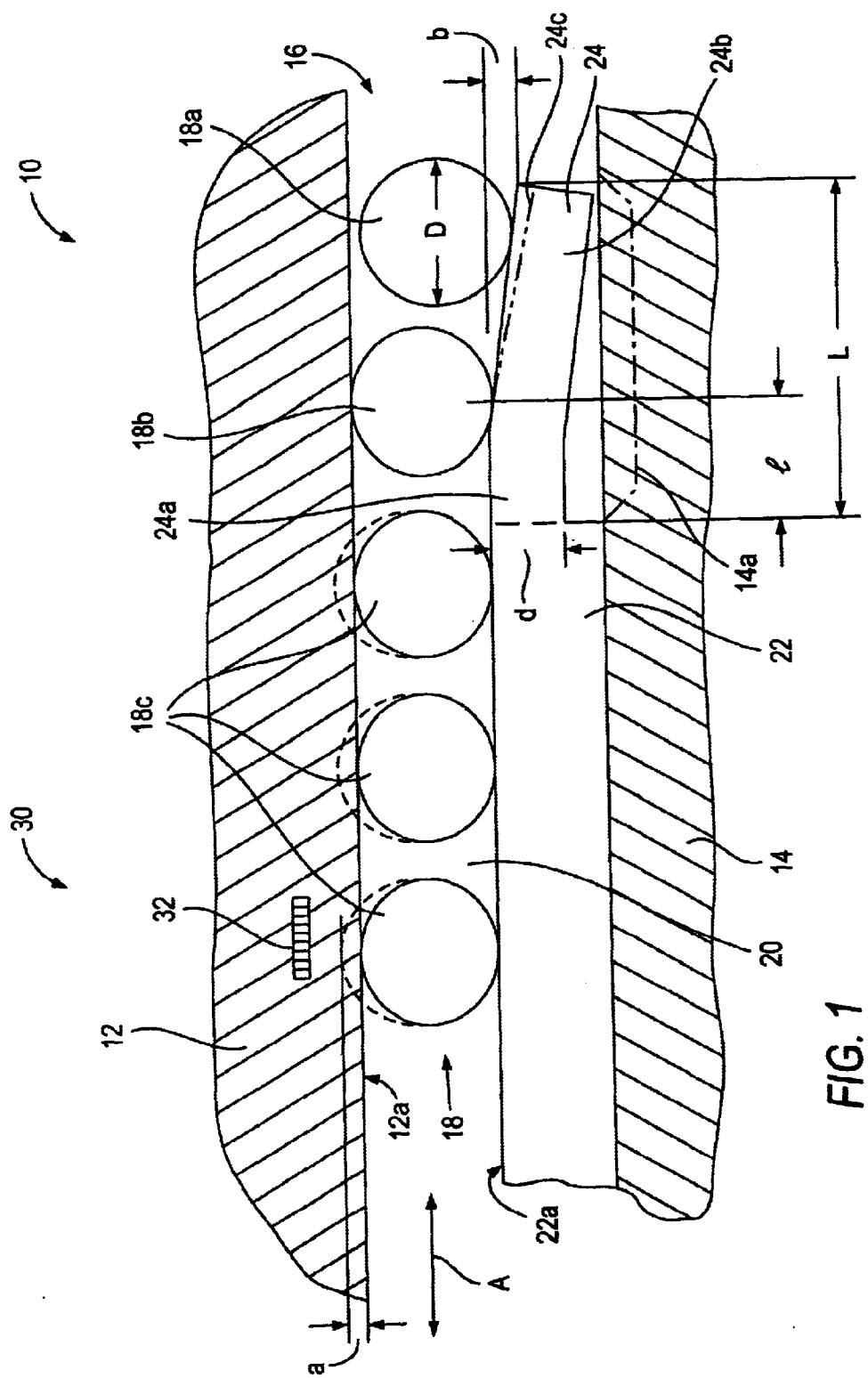
FIG. 1 is a view schematically showing a partial section of a linear guide device in accordance with the present invention.

A linear guide device in accordance with the present invention is identified as a whole with reference numeral 10. It includes a guide rail 12, and a guide car 14 which is reciprocatingly movable on the guide rail 12 in a longitudinal direction A. Furthermore, the linear guide device 10 also includes a roll body revolving unit 16, in which an endless row of roll bodies 18 revolve.

FIG. 1 shows a part of a load supporting portion 20 of the roll body revolving unit 16. The roll bodies 18 run in the embodiment shown in FIG. 1 from right into the load supporting portion 20 and arrive in a load-supporting engagement with a guide path valve 12a formed on the guide rail 12, as well as with a running path 22a formed on a running path element 22 which is connected with the guide car 14.

In the region of the roll body inlet the running path element 22 is formed with an undercut as shown in the drawings. With this undercut, it has a free supporting portion 24 which is not supported on the guide car 14. Under the action of the running-in roll bodies 18, this presupporting portion 24 is elastically deformed in its lower portion 24a which adjoins the main body of the running path element 22, so that an underportion 24b adjoining the free end of the free supporting portion 24 can serve as an inlet incline for the roll bodies 18. In FIG. 1 the free supporting portion 24 deviates totally by the distance. When a roll body 18 runs from right into the inlet region of the load supporting portion 20 of the roll body revolving unit 16, it is first completely load free (roll body 18a). With progressing further movement in FIG. 1 to left, the roll body is brought in abutment on the guide path 12a and the running path 22a, and first it is not deformed (roll body 18b). Finally, it takes over a load-supporting function, and between the guide path 12a of the guide car 12 and the running path 22a of the running path element 22 it is elastically compressed by the magnitude a. This is shown in FIG. 1 for the roll body 18c which is located in the load supporting portion 20 of the roll body revolving unit. The undeformed shape of the roll body 18c is shown in a broken line. The above described elastic deformation of the free supporting portion 24 and in particular its underportion 24a is a result of the counterforce which is applied by the roll bodies 18 in the course of the compression on the free supporting portion 24.

In order to guarantee that the roll body 18 can enter the inlet region completely load-free, or in other words the region of the free supporting portion 24 of the running path element 22, the deviation b of the free supporting portion must be greater than the magnitude a of the deformation of the roll body 18. This is provided in accordance with the present invention in that the length L of the free supporting portion 24 is at least as great as the diameter D of the roll body 18. In view of the maintaining the highest possible supporting property of the linear guide device 10 the length L must however amount to at most 3.5 times the diameter D of the roll body 18.

In analogous manner it has been shown that the length l of the elastically deformed underportion 24a of the free supporting portion 24 must amount at most to 1.5 times the diameter D of the roll body 18. For providing the gradual compression of the roll body 18 during entering the load supporting portion 20 of the roll body revolving unit 16 without excessive elastic deformation of the free supporting portion 24, with the running path element 20 composed of steel the thickness d of the free supporting portion 24 is selected to have a magnitude between substantially 1 mm and substantially 30 mm.

In addition or alternatively to the undercut of the running path element 22, the free supporting portion 24 of the running path element 22 can be provided also by forming a recess 14a on the guide car. This recess 14a is identified in FIG. 1 by a dash-dot line.

In order to guarantee the load-free entry of the roll body 17 also without significant elastic deformation of the free supporting portion 24, in addition at least a part of the free supporting portion 24 can be formed with a limiting incline 24c which is shown in FIG. 1 in a dash-dot line.

The linear guide device 10 according to the invention further comprises a position detecting device, for use preferably as an inductive position detecting device 30, in FIG. 1 only shown schematically, which comprises a measuring scale 32 located on the guide rail 12 and a sensor 34 located on the guide car 14. As is commonly known, the detection signal of the inductive position detecting device 30 responds sensitively to changes in the distance between the guide car 14 and the guide rail 12. In this connection, the use of the free supporting section 24 on the running element 22 according to the invention has the advantage of being able to keep low the tumbling movement of the guide car 14 relative to the guide rail 12 caused by the roll bodies 18 entering the supporting section 20.

It will be understood that each of the elements described above, or two or more together, may also find a useful application in other types of constructions differing from the types described above.

While the invention has been illustrated and described as embodied in a linear guide device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of the invention.

What is claimed as new and desired to be protected by Letters Patent is set forth in the appended claims:

1. A linear guide device, comprising a guide rail; a guide car reciprocatingly movable on said guide rail in a longitudinal direction; a roll body revolving unit in which an endless row of roll bodies revolve, said roll body revolving unit having a load supporting portion which the roll bodies come in a load supporting engagement with a guide path of said guide rail and also with a running path of said guide car, said running path of said guide car being formed on a running path element which is connected with said guide car and which at least on a roll body entry-side end has a free supporting portion which is not supported on said guide car, said free supporting portion having a length which is at least equal to a diameter of the roll bodies.

2. A linear guide device as defined in claim 1, wherein said free supporting portion has the length which amounts at most to 3.5 times the diameter of the roll bodies.

3. A linear guide device as defined in claim 1, wherein said free supporting portion of the running path element has a length which is at least equal to 1.2 times the diameter of the roll bodies.

4. A linear guide device as defined in claim 1, wherein the free supporting portion of the running path element has a length which amounts to substantially between 1.6 and 1.9 times the diameter of the roll bodies.

5. A linear guide device as defined in claim 1, wherein said free supporting portion of said running element has an elastically deformable underportion with a length which amounts at most to 1.5 times the diameter of the roll bodies.

6. A linear guide device as defined in claim 1, wherein at least a part of said free supporting portion of said running path element is formed as an entry incline.

7. A linear guide device as defined in claim 1, wherein said free supporting portion of said running path element is formed by a recess provided on said guide car.

8. A linear guide device as defined in claim 1, wherein said free supporting portion of said running path element is formed by a recess formed on said running path element.

9. A linear guide device as defined in claim 1; and further comprising a position detecting device having a measuring scale located on at least one of the elements selected from the group consisting of the guide rail and the guide car and a sensor located on another end of said elements selected from the group consisting of the guide rail and the guide car.

10. A linear guide device as defined in claim 9, wherein said position detecting device is formed as an inductive position detecting device.

* * * * *